(12) United States Patent
Choi et al.

(10) Patent No.: US 12,043,984 B2
(45) Date of Patent: Jul. 23, 2024

(54) ELECTRIC DRIVEN HYDRAULIC POWER SYSTEM

(71) Applicant: PYUNG KANG BIO IT MECHATRONICS CO., LTD., Iksan (KR)

(72) Inventors: Kil Ho Choi, Iksan (KR); Dong Hee Lee, Gimje (KR); Rock Jun Choi, Iksan (KR)

(73) Assignee: PYUNG KANG BIO IT MECHATRONICS CO., LTD., Iksan-si (KR)

( * ) Notice: Subject to any disclaimer, the term of this patent is extended or adjusted under 35 U.S.C. 154(b) by 0 days.

(21) Appl. No.: 17/796,862

(22) PCT Filed: Jan. 25, 2022

(86) PCT No.: PCT/KR2022/001266
§ 371 (c)(1),
(2) Date: Aug. 1, 2022

(87) PCT Pub. No.: WO2022/234926
PCT Pub. Date: Nov. 10, 2022

(65) Prior Publication Data
US 2024/0084554 A1 Mar. 14, 2024

(30) Foreign Application Priority Data
May 6, 2021 (KR) .......... 10-2021-0058267

(51) Int. Cl.
*E02F 9/22* (2006.01)
(52) U.S. Cl.
CPC .......... *E02F 9/2246* (2013.01); *E02F 9/2292* (2013.01)

(58) Field of Classification Search
CPC .......... F15B 2211/20515; E02F 9/2292; E02F 9/2246
See application file for complete search history.

(56) References Cited

U.S. PATENT DOCUMENTS

| 10,472,805 | B1* | 11/2019 | Kumeuchi | ............ E02F 9/2095 |
| 2019/0194970 | A1* | 6/2019 | Shinnaka | .............. E04H 13/006 |

FOREIGN PATENT DOCUMENTS

| JP | 2001-012404 A | 1/2001 |
| JP | 2003-102106 A | 4/2003 |

(Continued)

*Primary Examiner* — Abiy Teka
(74) *Attorney, Agent, or Firm* — Heedong Chae; Lucem, PC

(57) ABSTRACT

The present invention relates to an electric driven hydraulic power system for heavy equipment, and more particularly, to a hydraulic power system, which includes a hydraulic pump operated by a battery and a motor, a supply line for supplying a hydraulic oil that is supplied by the hydraulic pump, a plurality of actuators, and a controller for controlling the motor and the actuators, in which electrical efficiency is significantly improved. In particular, the present invention relates to an electric driven hydraulic power system in which a plurality of motors and a plurality of hydraulic pumps corresponding to the motors, respectively, are provided, and a main control valve (MCV) for receiving a hydraulic oil from the hydraulic pumps to supply the hydraulic oil to a plurality of actuators is provided, so that efficient control is performed according to an operating load, an operating temperature, a supply flow rate, and the like to minimize power consumption of the motor, and thus electrical efficiency is improved to dramatically increase an operating time.

4 Claims, 5 Drawing Sheets

(56) References Cited

FOREIGN PATENT DOCUMENTS

| JP | 2008-063902 A | 3/2008 |
|---|---|---|
| KR | 10-2019-0105709 A | 9/2019 |

\* cited by examiner

ELECTRIC DRIVEN HYDRAULIC POWER SYSTEM

TECHNICAL FIELD

The present invention relates to an electric driven hydraulic power system, and more particularly, to a hydraulic power system, which includes a hydraulic pump operated by a battery and a motor, a supply line for supplying a hydraulic oil that is supplied by the hydraulic pump, a plurality of actuators, and a controller for controlling the motor and the actuators, in which parallel control is performed to significantly improve electrical efficiency.

The present invention relates to an electric driven hydraulic power system in which a plurality of motors and a plurality of hydraulic pumps corresponding to the motors, respectively, are provided, and a main control valve (MCV) for receiving a hydraulic oil from the hydraulic pumps to supply the hydraulic oil to a plurality of actuators is provided, so that efficient control is performed according to an operating load, an operating temperature, a supply flow rate, and the like to minimize power consumption of the motor, and thus electrical efficiency is improved to dramatically increase an operating time.

BACKGROUND ART

In general, actuators used in heavy equipment such as an excavator and a specially equipped vehicle may be operated by a hydraulic system configured as a hydraulic cylinder or a hydraulic motor. The hydraulic system in the past has achieved an operation object of the heavy equipment by supplying a hydraulic oil to a control valve by using a hydraulic pump driven through a power take-off (PTO) device coupled to an output shaft of an engine, and operating a plurality of hydraulic actuators such as hydraulic cylinders and hydraulic motors by an opening/closing manipulation of the control valve. However, due to the recent eco-friendly discussion, efforts have been made to allow the hydraulic system of the heavy equipment to be performed by an electric motor. In other words, when the engine is turned off, or no engine is provided, the hydraulic pump may be driven only by a battery and the electric motor to supply the hydraulic oil.

However, although a conventional heavy equipment hydraulic system using an electric motor requires supply of a sufficient hydraulic oil because various actuator operations have to be simultaneously performed, a capacity of the motor and a capacity of a battery may not be indefinitely increased.

As shown in FIG. 1, according to a conventional general electric driven hydraulic system, an electric excavator may include, for example, a hydraulic cylinder for a boom, an arm, and a bucket, in which the hydraulic cylinder may be driven by an inverter and a main motor, and an inverter and a sub-motor may be separately provided to allow the excavator to travel.

Since the hydraulic system requires the main motor having a large capacity to supply a sufficient hydraulic oil to a plurality of actuators, a battery may be easily discharged. Accordingly, the inventor of the present invention has invented an electric driven hydraulic power system capable of greatly improving energy efficiency of an operation.

DISCLOSURE

Technical Problem

An object of the present invention to provide an electric driven hydraulic power system capable of enabling efficient use of electrical energy to greatly improve energy efficiency of an operation.

An object of the present invention is to provide an electric driven hydraulic power system capable of minimizing waste of a hydraulic oil and minimizing waste of electric energy by a motor and a hydraulic pump, which are operated to optimally supply a total amount of the hydraulic oil calculated according to a required hydraulic oil of an operating hydraulic actuator.

Technical Solution

To achieve the technical objects described above, according to the present invention, an improved electric driven hydraulic power system,
which is a hydraulic power system including a plurality of hydraulic actuators that are first to $k^{th}$ hydraulic actuators, includes:
a storage tank for accommodating a hydraulic oil;
first to $n^{th}$ motors, which are a plurality of motors, and first to $n^{th}$ inverters connected to the motors to convert a direct current of a battery into alternating currents for the motors and to convert driving forces and rotation speeds of the motors, respectively;
first to $n^{th}$ hydraulic pumps, which are a plurality of hydraulic pumps directly connected to shafts of the motors to supply the hydraulic oil introduced from a storage tank to a main control valve (MCV), respectively;
the main control valve (MCV) including a plurality of valves provided to control opening/closing of a flow path so as to receive the hydraulic oil supplied from the first to $n^{th}$ hydraulic pumps and selectively supply the hydraulic oil or block the supply of the hydraulic oil to the first to $k^{th}$ hydraulic actuators;
a control unit for individually controlling each of the inverters and each of the valves provided in the main control valve (MCV);
a battery for supplying a current to the first to $n^{th}$ motors, the main control valve (MCV), and the control unit; and
a battery management system (BMS) for controlling and managing the battery

Advantageous Effects

While power consumption is increased by a starting current in a case where a hydraulic oil is supplied by one motor and one hydraulic pump having a large capacity, a plurality of small motors may be used according to the present invention, so that a starting current of a motor can be minimized, and unnecessary current consumption can be suppressed.

According to the present invention, a control unit may calculate a flow rate of a hydraulic oil required according to an operation of each of actuators provided in a hydraulic power system to select one or more of motors, control a number of revolutions of the selected one or more of the motors to supply the number of revolutions to a main control valve (MCV), and individually control each of valves of the main control valve in consideration of a flow rate of the hydraulic oil required for each operation of heavy equipment, so that waste of the hydraulic oil can be minimized to maximize efficiency.

According to the present invention, a main controller may diagnose an overheated state or other problems of each of the motors and operate another motor in replacement of the motor based on a diagnosis result, so that efficiency and crisis coping capability can be improved.

BEST MODE

The present invention relates to an electric driven hydraulic power system, which does not include a separate internal combustion engine, so that a power take-off (PTO) device interworking with an engine output shaft may not be provided. However, in order to drive a plurality of hydraulic pumps, a plurality of motors corresponding to the hydraulic pumps may be provided. In general, a speed control of the motor may vary according to a type of the motor. A large industrial AC motor may control a speed by an inverter scheme, and a small AC motor used in a small household electronic product may adjust a speed by a phase control scheme.

Therefore, according to the present invention, the motors may be provided with inverters, respectively. The inverter may convert a direct current of a battery into an alternating current having an arbitrary desired frequency to supply the alternating current to the motor so as to control a rotation speed of the motor. In other words, the rotation speed of the motor may vary according to the frequency of the alternating current converted by the inverter I.

Figure 1:
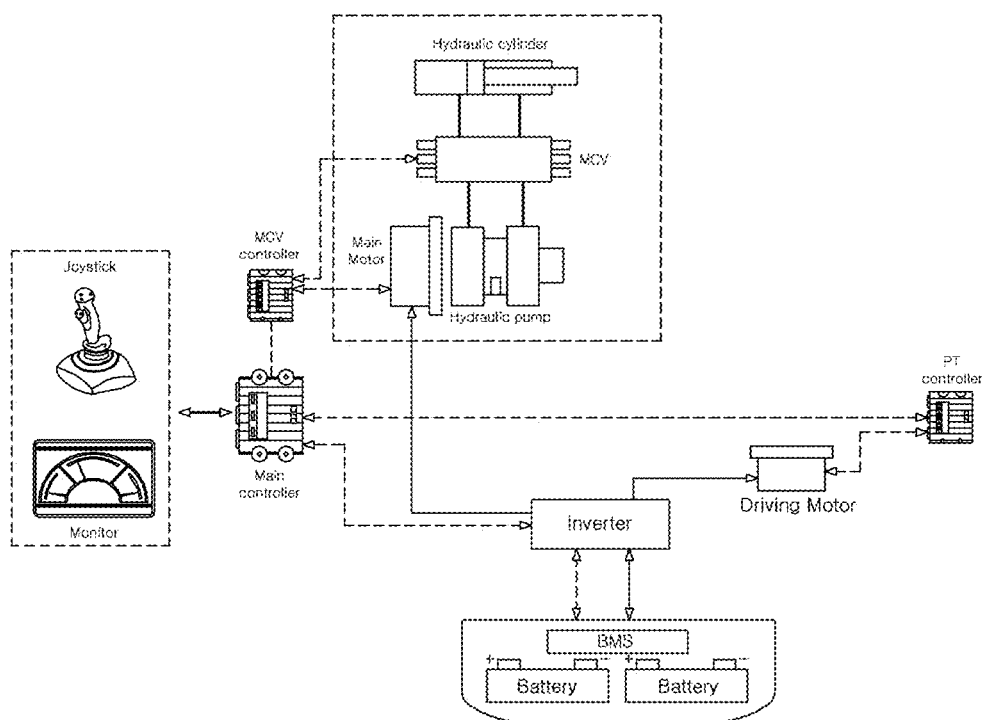
FIG. 1 is a view showing a configuration of a general electric driven hydraulic power system in heavy equipment.
Figure 2:
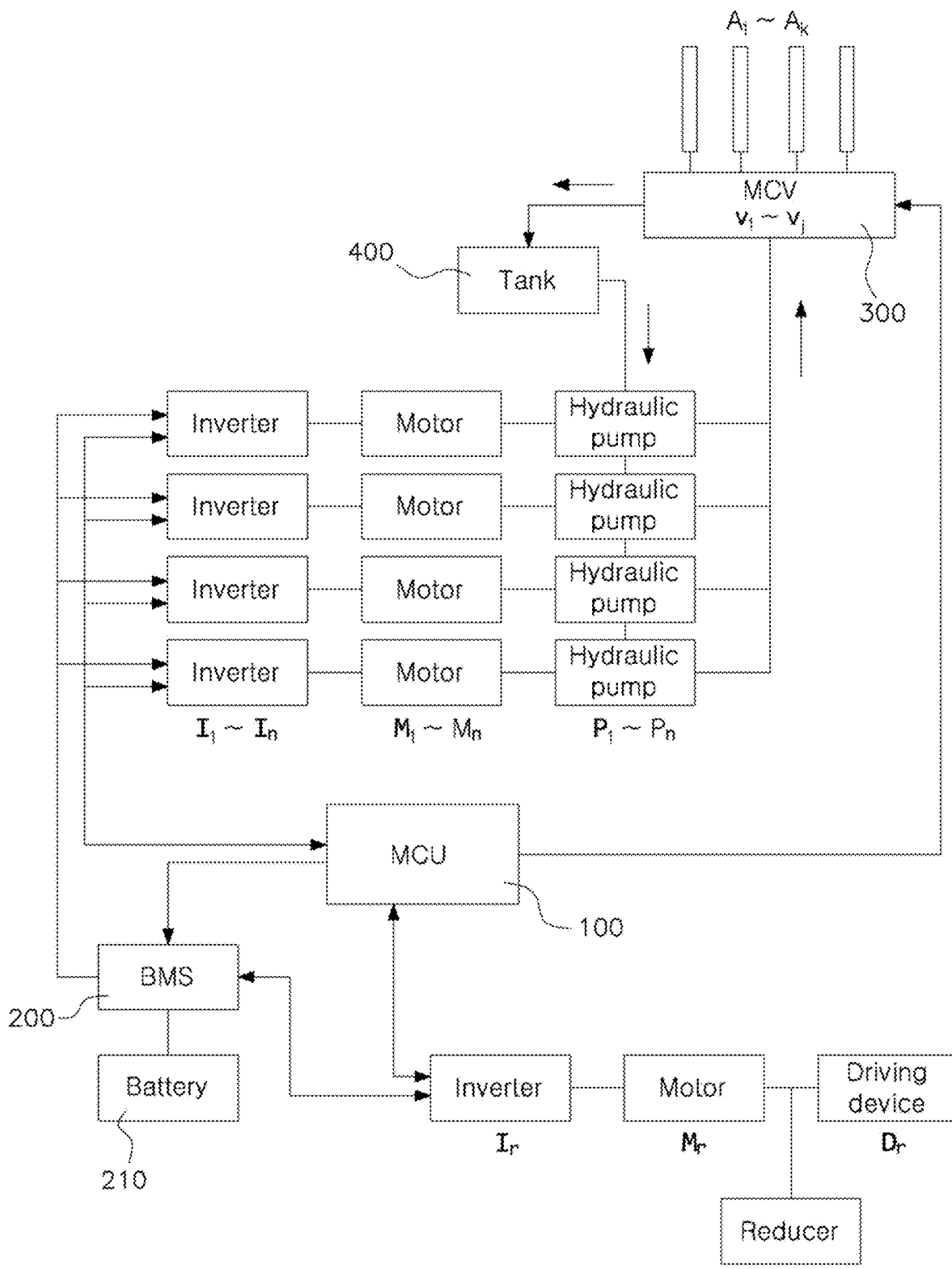
FIG. 2 is a conceptual view showing an electric driven hydraulic power system according to the present invention.

For ease of description, an excavator among heavy equipment according to an embodiment of the present invention will be described with reference to FIG. 2. However, the present invention is not limitedly applied only to the excavator. The excavator may be divided into a device that works by directly using a driving force of a motor and a device that works by changing a driving force of a motor into a hydraulic pressure and using a hydraulic actuator. In other words, the excavator may be a traveling device that works by directly using a driving force of the motor. In detail, the traveling device may include an $R^{th}$ driving motor $M_r$, and an $R^{th}$ inverter $I_r$ for adjusting a rotation speed of the $R^{th}$ motor $M_r$, and an $R^{th}$ reduction gear $D_r$ may be selectively provided on an output shaft of the $R^{th}$ motor $M_r$.

According to the present invention, the hydraulic power system refers to a device for operating a hydraulic actuator, the hydraulic power system may include a plurality of motors such as a first motor $M_1$, a second motor $M_2$, a third motor $M_3$, and a fourth motor $M_4$, and rotation speeds of the motors $M_1$ to $M_n$ may be adjusted by inverters $I_1$ to $I_n$, respectively. In addition, hydraulic pumps $P_1$ to $P_n$ may be directly connected to output shafts of the motors, respectively.

Discharge pipes $L_1$ to $L_n$ through which a hydraulic oil is discharged may be connected to discharge ends of the hydraulic pumps $P_1$ to $P_n$, respectively, the discharge pipes may be integrated into one supply pipe $L_{100}$, and the supply pipe $L_{100}$ may be connected to an inlet of a main control valve (MCV). Therefore, hydraulic oils discharged from one or more of the hydraulic pumps may be supplied to the inlet of the main control valve through the one supply pipe, and first to $j^{th}$ control valves $V_1$ to $V_j$ of the main control valve controlled through a control unit may allow the hydraulic oil introduced through the inlet to be selectively supplied to the one or more of first to $k^{th}$ hydraulic actuators $A_1$ to $A_k$ to perform a necessary operation and to be returned to a hydraulic oil tank through a return pipe $L_{200}$ connected to an outlet, or may allow the hydraulic oil introduced through the inlet to be directly returned to the hydraulic oil tank through the outlet when an operation of the hydraulic actuator is temporarily stopped.

The main control valve (MCV) may control passage or blockage of the hydraulic oil by a plurality of control valves provided inside the main control valve (MCV) and electronically controlled by the control unit. In detail, each of the control valves may selectively supply the hydraulic oil or cut off the supply of the hydraulic oil according to a hydraulic actuator that performs a required operation and an operating direction of the hydraulic actuator. In other words, a flow path of the hydraulic oil supplied from the hydraulic pump and introduced through the supply pipe may be controlled by the control valve provided inside the main control valve to selectively supply the hydraulic oil to a required hydraulic actuator among the first to $k^{th}$ hydraulic actuators $A_1$ to $A_k$, so that the hydraulic actuator may be operated.

The main controller valve may selectively open and close a flow path of the control valve (spool) by a hydraulic or electrical scheme to control a flow of the hydraulic oil. Preferably, according to the present invention, the inverter and the control valve of the main control valve may be electrically controlled by the control unit.

The control unit may individually and selectively control each of the first to $n^{th}$ inverters $I_1$ to $I_n$ to adjust the rotation speed of each of the motors, so that the flow rate of the hydraulic oil discharged from each hydraulic pump P may be adjusted. In addition, an overheated state may be detected by a temperature sensor provided in each of the motors, an operation of the motor in the overheated state may be stopped, and a motor that is operable in a best state may be selectively operated, so that efficiency of the motor may be maximized.

The present invention may require a battery management system (BMS) to use the battery with optimum efficiency, in which the control unit and the battery management system may exchange control information.

According to the present invention, the control unit may control the control valve of the main control valve to selectively control the hydraulic oil directed toward each of the hydraulic actuators. In addition, the control unit may select a motor to control a total amount of the hydraulic oil required for the above operation and supply a required amount of the hydraulic oil, and may supply the hydraulic oil to the main control valve by the hydraulic pump.

The first to $n^{th}$ motors $M_1$ to $M_n$ may be directly connected to the first to $n^{th}$ hydraulic pumps $P_1$ to $P_n$ having mutually different capacities, respectively, so that the each of the motors may be provided, and thus the motors may be combined to optimally supply the flow rate of the hydraulic oil required by the hydraulic actuators.

An operation example according to the present invention will be described. In other words, according to the present invention, a hydraulic pressure to be used in the hydraulic power system may be primarily generated by the first hydraulic pump, in which a constant hydraulic pressure may be maintained to drive the hydraulic power system through pressure compensation performed through flow control. In addition, since the second hydraulic pump, the third hydraulic pump, . . . , and the $n^{th}$ hydraulic pump may be operated as necessary, energy required to form the hydraulic pressure may be set to a minimum. Further, when a problem occurs in an operation of a specific motor or a specific hydraulic pump within the hydraulic power system, other motors and other hydraulic pumps may be used for the operation, so that problems that may occur in the hydraulic power system may be solved.

Figure 3:
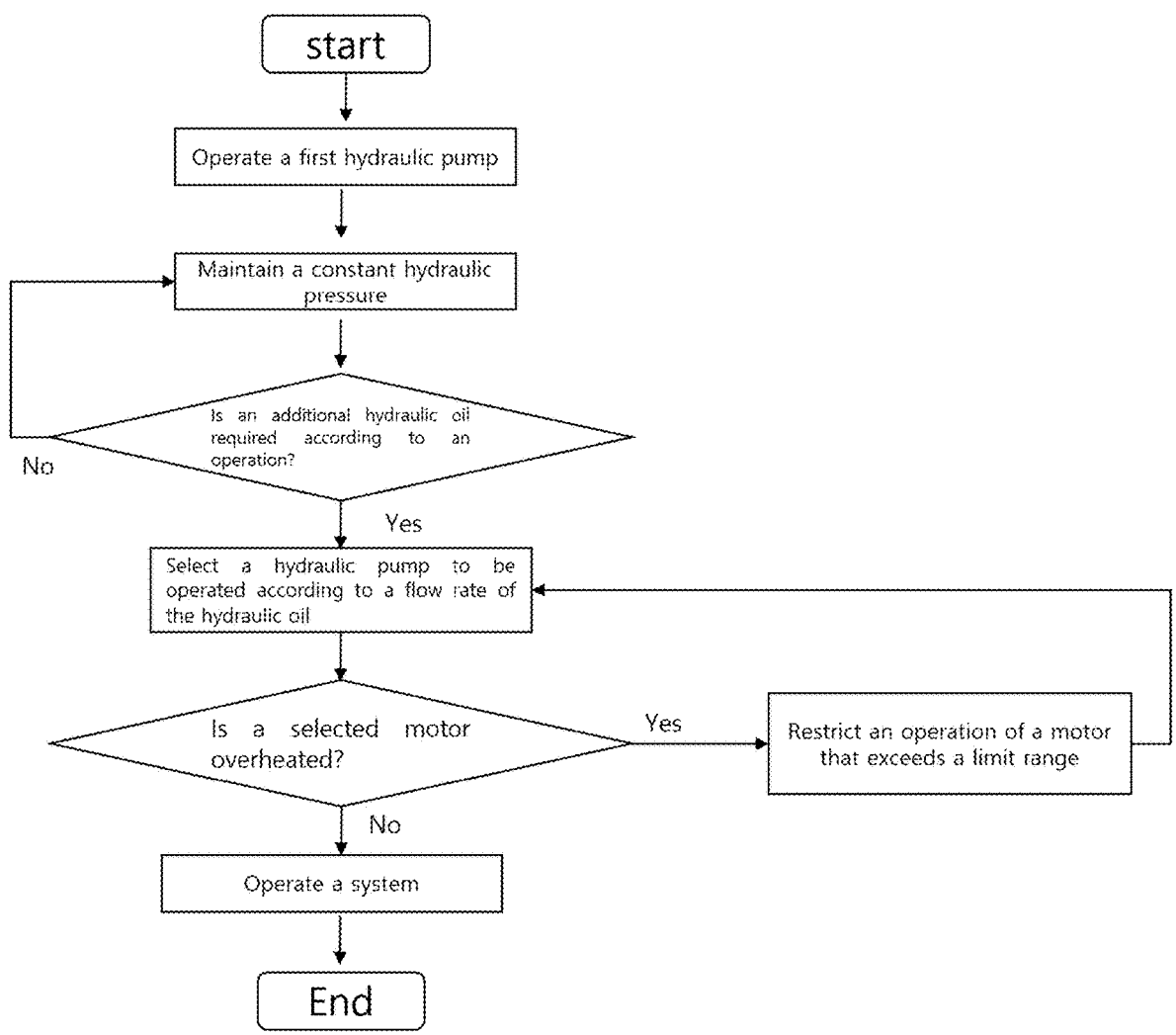
FIG. 3 is a flowchart showing an operation of the electric driven hydraulic power system according to the present invention.

FIG. 3 shows the hydraulic power system according to the present invention, in which the control unit calculates the hydraulic oil required for the hydraulic actuator, and selects and drives a hydraulic pump to be driven among the hydraulic pumps based on a calculation result.

In other words, the control unit may basically maintain a constant pressure within the hydraulic power system by operating the first hydraulic pump. In addition, the control unit may determine whether an operation of an additional hydraulic pump is necessary according to whether an additional operation of the hydraulic actuator is required. When no additional operation of the hydraulic pump is required, the operation of the first hydraulic pump may be continuously maintained, and when the additional operation of the hydraulic pump is required, a hydraulic pump among the second, third, . . . , and $n^{th}$ hydraulic pumps may be selected and operated according to a required flow rate of the hydraulic oil, in which the hydraulic oil having an optimum flow rate may be discharged by adjusting a number of revolutions of the motor. However, in this case, characteristics of a voltage, a current, a number of revolutions, a torque, and a temperature of the motor may be regularly checked and monitored. In addition, when a specific motor exceeds a limit range due to overheating, the operation of the motor that exceeds the limit range may be stopped, the overheated motor may stand by until the overheated motor cools down, and another replacement motor may be selected and driven to supplement the required flow rate of the hydraulic oil. For example, when the second motor exceeds the limit range due to overheating, the second motor may stand by for cooling, the third motor may be operated instead of the second motor, a power for the second motor may be cut off to allow the second motor to stand by, and the second motor may be operated instead of the third motor after the cooling is sufficiently achieved.

Figure 4:
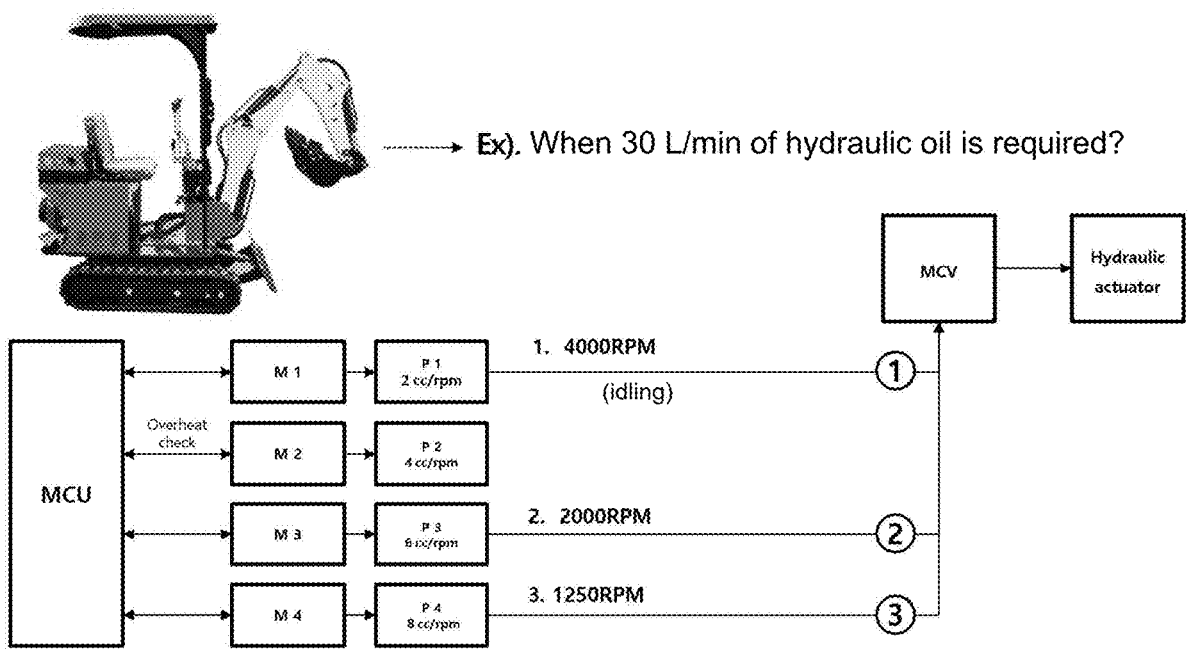
FIG. 4 is a view illustrating the operation of the electric driven hydraulic power system according to the present invention.

FIG. 4 shows a hydraulic power system according to one embodiment of the present invention. According to the hydraulic power system of the present invention, when 30 L/min of hydraulic oil is required from one or more of hydraulic actuators, first, the first hydraulic pump having a small capacity (2 cc/rpm) may be driven at 4000 rpm by the first motor to supply the hydraulic oil at 8 L/min so as to maintain a constant hydraulic pressure. In addition, when an additional flow rate of the hydraulic oil is required, and when a defect such as overheating occurs in the second motor, the third hydraulic pump having a medium capacity (6 cc/rpm) may be driven by the third motor, and the fourth hydraulic pump having a large capacity (8 cc/rpm) may be driven by the fourth motor. In general, the hydraulic power system is required to maintain a minimum constant hydraulic pressure. Therefore, ① when the first motor idles at 4000 rpm, the first hydraulic pump may continuously supply the hydraulic oil at 8 L/min to maintain the constant hydraulic pressure. In addition, when the additional hydraulic oil is required, ② the third motor and the third hydraulic pump having the medium capacity (6 cc/rpm) may be driven at 2000 rpm so that the third hydraulic pump may supply the hydraulic oil at 12 L/min, and ③ the fourth motor and the fourth hydraulic pump having a relatively large capacity (8 cc/rpm) may be driven at 1250 rpm so that the fourth hydraulic pump may supply the hydraulic oil at 10 L/min. According to the above driving scheme, 30 L/min of the hydraulic oil may be supplied.

Figure 5:
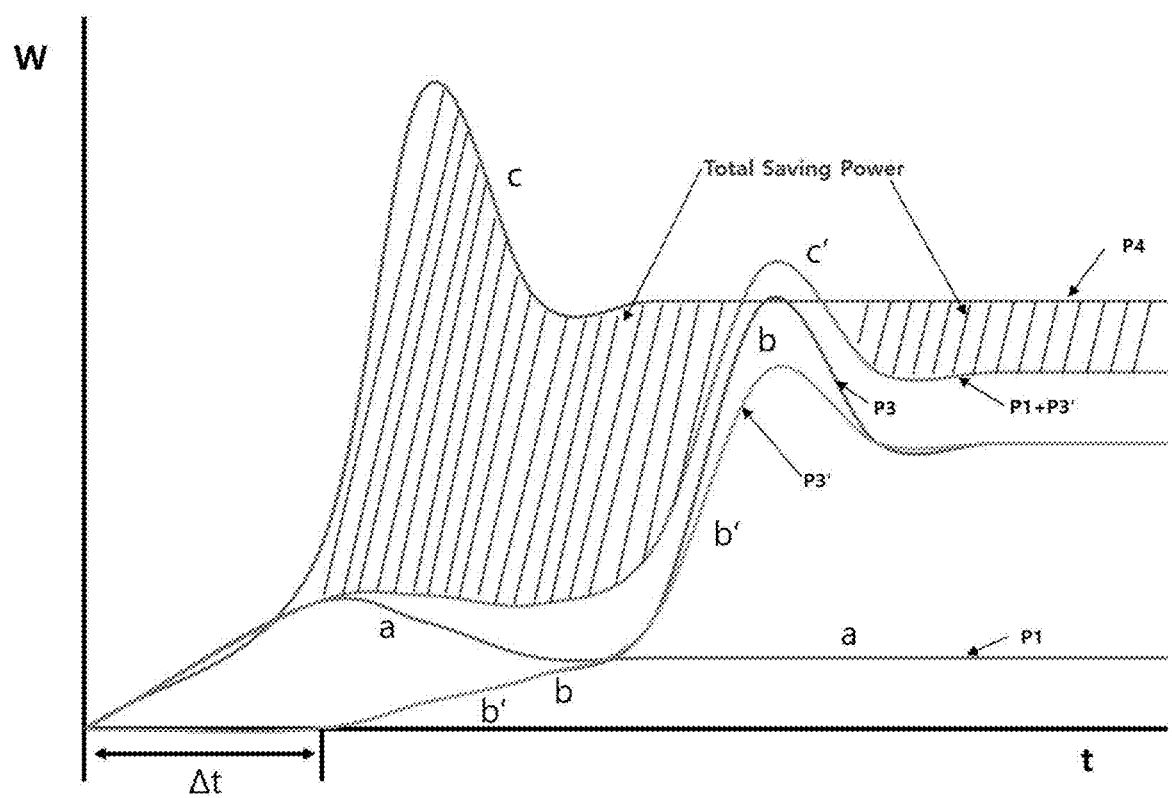
FIG. 5 is a graph showing driving power consumption for each hydraulic pump according to the present invention.

FIG. 5 is a graph showing power consumption with respect to an operating flow rate that may be discharged per revolution in a motor in each of hydraulic pumps. When each of the hydraulic pumps is individually driven, power consumption of the motors has a tendency to rapidly increase in an initial stage and then gradually decrease due to a starting power. The starting power may be further increased to drive a hydraulic pump having a large capacity. It may be found that a difference in power consumption occurs according to a driving order in selecting a pump used to discharge the same capacity of the hydraulic oil.

In other words, a curve a shows that when the first hydraulic pump having the small capacity (2 cc/rpm) is operated at a constant rpm, the power consumption initially increases due to the starting power and then decreases to maintain constant power consumption. A curve b shows that when the third hydraulic pump having the medium capacity (6 cc/rpm) is operated at a constant rpm, the power consumption initially increases due to the starting power and then decreases to maintain constant power consumption. A curve c shows that when the fourth hydraulic pump having the large capacity (8 cc/rpm) operated at a constant rpm, the power consumption initially increases due to the starting power and then decreases to maintain constant power consumption W.

A curve b' indicates the power consumption W of the third hydraulic pump when the first hydraulic pump having the small capacity (2 cc/rpm) is driven to form a constant hydraulic pressure, and the third hydraulic pump having the medium capacity (6 cc/rpm) is operated at a constant rpm, whereas the curve b is a power consumption curve when only the third hydraulic pump is driven alone. Accordingly, it may be found that the starting power of the curve b' is lower than the starting power of the curve b.

In addition, the curve c is a power consumption curve when the hydraulic oil is discharged by the fourth hydraulic pump $P_4$ having the large capacity (8 cc/rpm), and a curve c' is a power consumption curve when the hydraulic oil is discharged by the first hydraulic pump $P_1$ having the small capacity (2 cc/rpm) to form a constant hydraulic pressure, and discharged by driving the third hydraulic pump $P_3$ having the medium capacity (6 cc/rpm) so that a total flow rate of the hydraulic oil may be 8 cc/rpm. When the curves c and c' are compared with each other, a case in which the hydraulic pumps having the small capacity and the medium capacity are used together may be significantly more advantageous in the power consumption including the starting power than a case in which the hydraulic pump having the large capacity is used.

Furthermore, when it is necessary to drive the fourth hydraulic pump having the large capacity (8 cc/rpm) by the fourth motor according to the operation of the hydraulic actuator, after the first hydraulic pump having the small capacity (2 cc/rpm) is driven, the third hydraulic pump having the medium capacity (6 cc/rpm) may be driven, and the fourth hydraulic pump may be sequentially driven, so that the power consumption of the fourth motor required to drive the fourth hydraulic pump may be significantly reduced. In other words, a plurality of hydraulic pumps may be sequentially operated at a time interval to remarkably reduce the power consumption including the starting power, so that a usage time of the battery may be further improved.

INDUSTRIAL APPLICABILITY

The present invention relates to an electric driven hydraulic power system, and more particularly, to a hydraulic power system, which includes a hydraulic pump operated by a battery and a motor, a supply line for supplying hydraulic oil that is supplied by the hydraulic pump, a plurality of actuators, and a controller for controlling the motor and the actuators, in which parallel control is performed to significantly improve electrical efficiency, so that the hydraulic power system may be applied to a specially equipped vehicle and the like so as to achieve industrial applicability.

The invention claimed is:

1. An improved electric driven hydraulic power system including a plurality of hydraulic actuators, which are first to kth hydraulic actuators (A1 to AK), the electric driven hydraulic power system comprising:
a first motor (M1), a second motor (M2), . . . , and an nth motor (Mn), which are a plurality of motors, and a first inverter (I1), a second inverter (I2), . . . , and an nth inverter (In) connected to the motors to convert a direct current of a battery into alternating currents and to convert rotation speeds of the motors, respectively;
a first hydraulic pump (P1), a second hydraulic pump (P2), . . . , and an nth hydraulic pump (Pn), which are a plurality of hydraulic pumps directly connected to shafts of the motors to supply a hydraulic oil introduced from a storage tank to a main control valve (MCV), respectively;
the main control valve (MCV) including a plurality of control valves, which are first to jth control valves (V1 to Vj) provided inside the main control valve (MCV) to convert a flow path of the hydraulic oil so as to receive the hydraulic oil supplied from the first to nth hydraulic pumps (P1 to Pn) and selectively supply the hydraulic oil or block the supply of the hydraulic oil to the first to kth hydraulic actuators (A1 to Ak);
the hydraulic actuators, which are the first to kth hydraulic actuators (A1 to AK) for receiving the hydraulic oil of the main control valve (MCV) to perform predetermined operations;
a control unit (100) for individually controlling each of the first to nth inverters (I1 to In), each of the first to nth motors (M1 to Mn), and the control valves, which are the first to jth control valves (V1 to Vj) provided inside the main control valve (MCV);
a storage tank (400) for supplying the hydraulic oil to the first to nth hydraulic pumps (P1 to Pn), and accommodating the hydraulic oil returned from the main control valve (MCV);
a battery for supplying a current to the first to nth motors (M1 to Mn), the main control valve (MCV), and the control unit; and
a battery management system (BMS) for controlling and managing the battery, wherein first to nth discharge pipes (L1 to Ln) are connected to outlets of the first to nth hydraulic pumps (P1 to Pn), respectively, the discharge pipes are integrated into one supply pipe (L100), and the supply pipe (L100) is connected to an inlet of the main control valve (MCV), and
wherein a hydraulic pump and a motor among the first to nth motors (M1 to Mn) are selected and driven in consideration of a required flow rate of the hydraulic oil, in which when the selected motor is already overheated, the selected motor is not driven, and a hydraulic pump having a second-largest capacity and a motor are selected to be driven.

2. The electric driven hydraulic power system of claim 1, wherein the first to nth hydraulic pumps (P1 to Pn) are configured as a plurality of hydraulic pumps having mutually different capacities, in which the control unit (100) first operates one hydraulic pump to maintain a constant hydraulic pressure and sequentially operates another hydraulic pump after a predetermined time so as to reduce power consumption.

3. An improved electric driven hydraulic power system including a plurality of hydraulic actuators, which are first to kth hydraulic actuators (A1 to AK), the electric driven hydraulic power system comprising:
a first motor (M1), a second motor (M2), . . . , and an nth motor (Mn), which are a plurality of motors, and a first inverter (I1), a second inverter (I2), . . . , and an nth inverter (In) connected to the motors to convert a direct current of a battery into alternating currents and to convert rotation speeds of the motors, respectively;
a first hydraulic pump (P1), a second hydraulic pump (P2), . . . , and an nth hydraulic pump (Pn), which are a plurality of hydraulic pumps directly connected to shafts of the motors to supply a hydraulic oil introduced from a storage tank to a main control valve (MCV), respectively;
the main control valve (MCV) including a plurality of control valves, which are first to jth control valves (V1 to Vj) provided inside the main control valve (MCV) to convert a flow path of the hydraulic oil so as to receive the hydraulic oil supplied from the first to nth hydraulic pumps (P1 to Pn) and selectively supply the hydraulic oil or block the supply of the hydraulic oil to the first to kth hydraulic actuators (A1 to Ak);
the hydraulic actuators, which are the first to kth hydraulic actuators (A1 to AK) for receiving the hydraulic oil of the main control valve (MCV) to perform predetermined operations;
a control unit (100) for individually controlling each of the first to nth inverters (I1 to In), each of the first to nth motors (M1 to Mn), and the control valves, which are the first to jth control valves (V1 to Vj) provided inside the main control valve (MCV);
a storage tank (400) for supplying the hydraulic oil to the first to nth hydraulic pumps (P1 to Pn), and accommodating the hydraulic oil returned from the main control valve (MCV);
a battery for supplying a current to the first to nth motors (M1 to Mn), the main control valve (MCV), and the control unit; and
a battery management system (BMS) for controlling and managing the battery,
wherein first to nth discharge pipes (L1 to Ln) are connected to outlets of the first to nth hydraulic pumps (P1 to Pn), respectively, the discharge pipes are integrated into one supply pipe (L100), and the supply pipe (L100) is connected to an inlet of the main control valve (MCV), wherein the control unit (100) selects and drives a hydraulic pump among the hydraulic pumps based on a total amount of the hydraulic oil required to operate one or more of the first to kth hydraulic actuators (A1 to AK), in which the control unit (100) performs a control to first drive a hydraulic pump having a small capacity to discharge the hydraulic oil having a required flow rate.

4. The electric driven hydraulic power system of claim 3, wherein the first to nth hydraulic pumps (P1 to Pn) are configured as a plurality of hydraulic pumps having mutually different capacities, in which the control unit (100) first operates one hydraulic pump to maintain a constant hydraulic pressure and sequentially operates another hydraulic pump after a predetermined time so as to reduce power consumption.

* * * * *